(12) United States Patent
Tomasiewicz et al.

(10) Patent No.: US 9,838,494 B1
(45) Date of Patent: Dec. 5, 2017

(54) REDUCING RETRIEVAL TIMES FOR COMPRESSED OBJECTS

(71) Applicant: Amazon Technologies, Inc., Reno, NV (US)

(72) Inventors: Daniel Tomasiewicz, Sunnyvale, CA (US); Chao Deng, San Jose, CA (US); Gopal Harikumar, Fremont, CA (US); Amit Santosh Jain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 201 days.

(21) Appl. No.: 14/313,732

(22) Filed: Jun. 24, 2014

(51) Int. Cl.
*H04L 29/08* (2006.01)
*H04L 29/06* (2006.01)
*G06F 17/30* (2006.01)

(52) U.S. Cl.
CPC .... *H04L 67/2828* (2013.01); *G06F 17/30858* (2013.01); *H04L 69/04* (2013.01)

(58) Field of Classification Search
None
See application file for complete search history.

(56) References Cited

U.S. PATENT DOCUMENTS

| | | | | |
|---|---|---|---|---|
| 8,094,872 B1 * | 1/2012 | Yagnik | | G06K 9/00711 380/201 |
| 2002/0152317 A1 * | 10/2002 | Wang | | H04N 21/234354 709/231 |
| 2002/0184333 A1 * | 12/2002 | Appelman | | H04L 29/06 709/217 |
| 2003/0005047 A1 * | 1/2003 | Seki | | H04L 29/06 709/203 |
| 2005/0127171 A1 * | 6/2005 | Ahuja | | G06F 21/606 235/382 |
| 2005/0198395 A1 | 9/2005 | Verma et al. | | |

(Continued)

OTHER PUBLICATIONS

"Google Proxy Used for Chrome's Mobile Data Compression," http://www.zdnet.com/article/google-proxy-used-for-chromes-mobile-data-compression/, Jan. 16, 2014.

(Continued)

*Primary Examiner* — Thomas Dailey
(74) *Attorney, Agent, or Firm* — Knobbe Martens Olson & Bear LLP

(57) ABSTRACT

An intermediary system reduces a delay associated with the compression and transmission of content resources to a user's device. For example, the intermediary system compresses a first content resource, generates a signature of the first content resource, stores the compressed first content resource and the generated signature, and transmits the compressed first content resource to the user's device. When the user's device or another user's device requests a second content resource at a later time, the intermediary system generates a signature of the second content resource and compares it with the signature of the first content resource. If the signatures match (meaning the first and second content resources are very likely identical), then the intermediary system merely transmits the compressed first content resource to the appropriate device instead of first compressing the second content resource and then transmitting the compressed second content resource to the appropriate device.

31 Claims, 5 Drawing Sheets

(56) References Cited

U.S. PATENT DOCUMENTS

| | | | | |
|---|---|---|---|---|
| 2008/0189552 A1* | 8/2008 | Adent | ............... | H04L 63/12 |
| | | | | 713/181 |
| 2008/0270373 A1* | 10/2008 | Oostveen | ......... | G06F 17/30825 |
| 2009/0070414 A1* | 3/2009 | Singal | ............ | G06F 17/30899 |
| | | | | 709/203 |
| 2013/0031539 A1* | 1/2013 | Liverance | ............. | G06F 9/44 |
| | | | | 717/171 |
| 2013/0058477 A1* | 3/2013 | Kobayashi | ............ | G06F 21/72 |
| | | | | 380/28 |

OTHER PUBLICATIONS

"Opera with Turbo Will Be a Faster, Smarter Android Browser," http://gizmodo.com/5850506/opera-with-turbo-will-be-a-faster-smarter-android-browser, Oct. 17, 2011.

* cited by examiner

REDUCING RETRIEVAL TIMES FOR COMPRESSED OBJECTS

BACKGROUND

Some user devices exist in a networking environment that includes an intermediary system (e.g., a proxy server). The intermediary system may retrieve data objects on behalf of a user device, process the data objects, and transfer the processed data objects to the user device. For example, the intermediary system may compress data objects and transfer the compressed data objects to the user device. Often, service providers offer data plans that limit the amount of data that can be transferred in a given period of time. Thus, compressing the data objects may allow users to stay within their data plan limits.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
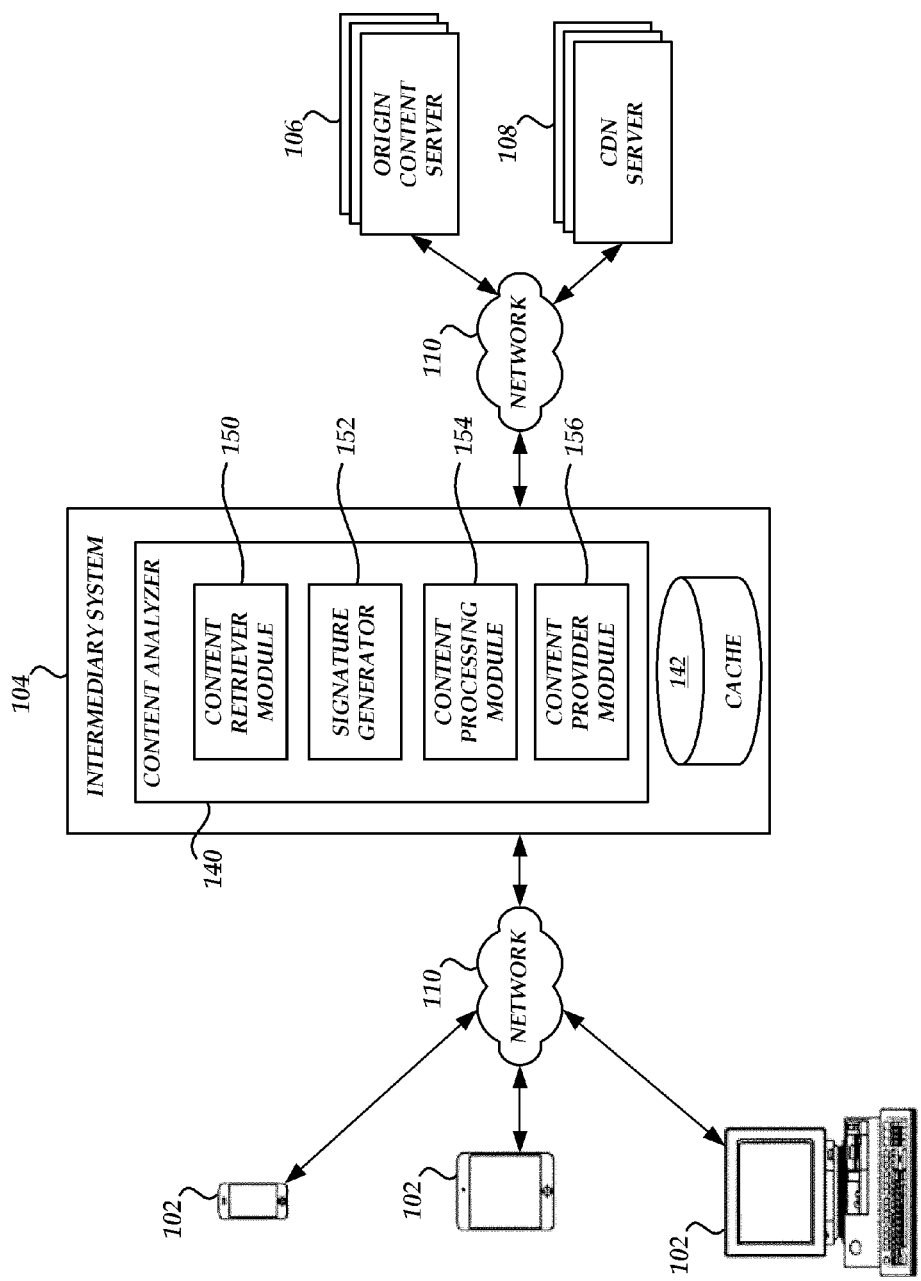
FIG. 1 illustrates a content delivery environment with an intermediary system that processes content and reduces a delay associated with the transfer of the content to user devices according to one embodiment.

As described above, an intermediary system (e.g., a proxy server) that compresses data objects (e.g., network content resources, such as text, documents, images, video, etc.) transferred to a user's device can help the user stay within the limits of his or her data plan. In some cases, the user may actively request content. For example, the user may choose to view photographs, watch videos, download attachments, or browse through other information available over a network. When the user actively requests content, any extended delays between when the content is requested and when the content is received (e.g., due to the compression) may be noticeable. Static content resources, such as those content resources that do not change often, can be pre-compressed and stored for later delivery to the user's device. Thus, the user may not perceive any delay in the delivery of static content resources. Content resources that change often, though, may be compressed while the user is waiting for the content resources to be delivered. Thus, while such compression can have the effect of reducing the volume of data downloaded by the user's device, it can also reduce the perceived responsiveness of the content site or the user device by making the user wait while the content resources are being compressed. When the delay is significant (e.g., several seconds or more), the task of browsing can be frustrating for users.

Accordingly, the embodiments described herein include systems and methods that reduce the additional delays caused by compression. As described herein, an intermediary system can receive a first content resource intended for a user's device. The intermediary system can compress the first content resource, generate a signature of the first content resource, and transmit the compressed first content resource to the user's device. The intermediary system may also store the compressed first content resource and the associated signature in a data store, such as a cache. Thus, when the user's device or another user's device requests a second content resource at a later time, the intermediary system can retrieve the second content resource from a host server, generate a signature of the second content resource, and compare the signature of the second content resource with the signature of the first content resource stored in the data store. If the comparison does not yield a match, then the intermediary system can compress the second content resource, store the compressed second content resource in the data store, and transmit the compressed second content resource to the appropriate device. If, on the other hand, the comparison yields a match, then an assumption can be made that the user's device or another user's device is requesting a content resource that has already been requested in the past and that the content resource has not been modified in any way (e.g., the first content resource and the second content resource are identical). Thus, the intermediary system can merely transmit the compressed first content resource to the appropriate device instead of first compressing the second content resource and then transmitting the compressed second content resource to the appropriate device. This may reduce a user-perceived delay in the loading of a page or content because the processing time for generating a signature is ordinarily significantly less than the processing time for compressing a resource.

If the content resource has a large file size (e.g., a video file) and includes a header with an index, then the intermediary system may not retrieve the entire content resource. Rather, the intermediary system may retrieve just the header of the content resource or may stop retrieving the content resource once the header is fully assembled. The index included in the header helps a computing device locate data samples within the data portion of the content resource (e.g., by including pointers to the data samples within the data portion). The intermediary system may generate a signature based on the index and compare the generated signature to signatures stored in the data store. If the comparison yields a match, then the intermediary system can retrieve from the cache and transmit a compressed version of the content resource associated with the matching signature to the appropriate device. If the comparison does not yield a match, then the intermediary system can retrieve the entire content resource, compress the content resource, and transmit the compressed content resource to the appropriate device. Content resources that have large file sizes but no header and/or index may be processed by retrieving the entire content resource and generating a signature based on the entire content resource, as described above.

The intermediary system may generate the signature by applying a hash function to at least a portion of the content of a content resource. For example, the intermediary system may apply a hash function to the entire contents of an image. As used herein, the hash function may refer to any function that maps data of an arbitrary length to data of a fixed length. The hash function may be a cyclic redundancy check (e.g., crc16, crc32, etc.), a checksum (e.g., sum32, fletcher-32, etc.), a non-cryptographic hash function (e.g., Pearson hashing, elf64, etc.), a cryptographic hash function (e.g., MD5, SHA-256, etc.), and/or the like. As described above, while a signature may be generated for each content resource regardless of whether the content resource is compressed, the resources used to generate the signature and the delay associated with generating the signature may be much less than the resources used to perform compression and the delay associated with the compression.

The intermediary system may also generate the signature by applying a hash function to at least a portion of a header of a content resource, such as when the content resource is a large file with an index. For example, a video file generally includes a header that includes an index (e.g., a movie box) that helps a computing device locate data samples within the data portion of the video file (e.g., by including pointers to the data samples within the data portion). Furthermore, the indices are generally unique for each unique video file. The intermediary system may apply a hash function to the entire index. Alternatively, the intermediary system may apply a hash function to the entire index and a portion of the data of a video file. In a similar manner, a hash function can be applied to the index of any file that includes an index, such as an audio file, a PDF document, and/or the like. Generating the signature based on the entire contents of a large file may be time consuming. Thus, generating the signature based on a portion of the file (e.g., the index), rather than the entire contents of the file, may reduce the processing time associated with generating the signature and thereby reduce the user-perceived delay in loading a page.

The intermediary system may determine whether to generate a signature based on all content of the resource (e.g., all of the content resource's bits) versus only a portion of the content resource (e.g., the content resource's index only). For example, the intermediary system may make the determination based on a file type (e.g., the intermediary system may generate a signature based on all content of the resource if the resource is an image, but may only generate a signature based on a portion of the content resource if the content resource is a video file), a file size (e.g., the intermediary system may generate a signature based on all content of the resource if its file size is below a threshold value and may generate a signature based on a portion of the content resource if its file size is above the threshold value), whether the content resource includes an index (e.g., the intermediary system may generate a signature based on all content of the resource if the content resource does not include an index and may generate a signature based on a portion of the content resource if the content resource does include an index), a time it may take to retrieve a content resource (e.g., the intermediary system may generate a signature based on all content of the resource if the content resource can be retrieved in a time under a threshold value and may generate a signature based on a portion of the content resource if the content resource cannot be retrieved in a time under the threshold value), and/or the like.

In some embodiments, the intermediary system generates and caches multiple compressed versions of a given content resource (e.g., such that different versions have different compression levels) and selects between these different compressed versions when providing requested content resources to the user's device. For example, when a content resource is requested and a signature associated with the content resource does not match any of the stored signatures, the intermediary system may generate multiple compressed versions of the content resource using different levels of compression, where the resulting files are of different sizes. The intermediary system may decide which version of the compressed content resource to send to a user's device based on the capabilities of the user's device, network conditions (e.g., available bandwidth, the connection speed of the user's device, etc.), and/or a request for a particular version received from the user's device.

As another example, when the intermediary system retrieves a content resource requested by a user's device, the intermediary system may generate a signature of the content resource and compare it with other stored signatures. If the signature matches a stored signature, the intermediary system may determine whether the content resource associated with the stored signature has been compressed at a desired level (e.g., where the desired level is determined based on the capabilities of the user's device, network conditions, a compression level specified in the request from the user's device, etc.). If the cache contains a version of the content resource that is compressed at the desired level (e.g., this may be determined based on data, such as metadata, associated with the cached content resource or its signature), the compressed content resource is provided from the cache to the user's device. If the cache does not contain a version of the content resource that is compressed at the desired level, then the intermediary system may compress the content resource at the desired level and provide the compressed content resource to the user's device. In addition, the intermediary system may be aware of the various levels of compression that may be requested or provided to user devices associated with the intermediary system. Before, during, or after providing the compressed content resource to the user's device, the intermediary system may determine whether the content resource has been compressed at all levels. If the content resource has not been compressed at all levels, the intermediary system may compress the content resource at the levels for which the content resource has not been compressed and store the compressed content resources for later use.

The data store may store compressed content resources indefinitely or for a defined period of time. For example, a compressed content resource may continue to be stored in the data store even if a host or origin server updates the content resource and the updated content resource has also been compressed. As another example, compressed content resources may be deleted from the data store after they have been stored for a set period of time. As another example, compressed content resources defined as the least recently used (e.g., compressed content resources that have not been requested for a set period of time) may be deleted from the data store.

While the techniques disclosed herein are described with respect to an intermediary system, this is not meant to be limiting. For example, the techniques disclosed herein can be performed by a host or origin server that provides content resources to user devices.

Furthermore, while the techniques disclosed herein are described with respect to the compression of content resources, this is not meant to be limiting. The techniques disclosed herein may apply to any processing of content resources. For example, some intermediary systems or host or origin servers may process content resources in any way that transforms the content resource. Transforming a content resource may include adding a watermark to the content of a content resource, adding a logo to the content of a content resource, resizing a content resource, performing a virus scan, generating a checksum, compiling the content resource such that the content resource is assembled in a format that executes faster (e.g., pre-compiling source code, such as a script like JavaScript, so that an application can more quickly execute the source code), and/or the like. Thus, instead of compressing a content resource, the intermediary system or host or origin servers may instead process the content resource in any way as described above. The intermediary system or host or origin server may store the processed content resources in the data store and transmit a processed content resource stored in the data store to a user's device if a signature of the processed content resource matches the signature of a requested content resource.

System Components

FIG. 1 illustrates a content delivery environment with an intermediary system that processes content and reduces a delay associated with the transfer of the content to user devices according to one embodiment. The network environment shown in FIG. 1 includes various user devices 102, an intermediary system 104, and various content sources, including origin content servers 106 and content delivery network ("CDN") servers 108. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may receive content via the intermediary system 104 to which it is closest, rather than all user devices 102 receiving content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application to communicate via the network 110 with other computing systems, such as the intermediary system 104 or content sources 106 and 108, in order to request and display content.

Illustratively, a user may use a browser application to request network-accessible content (e.g., content pages, images, video, etc.) hosted or provided by a content source, such as an origin content server 106 or a CDN server 108. The user device 102 or the browser application in particular may be associated with the intermediary system 104 or otherwise configured to request the content through, and receive content from, the intermediary system 104 rather than communicating directly with the content source.

The intermediary system 104 can be a computing system configured to retrieve content on behalf of user devices 102, compress the content, and transmit the compressed content to the user devices 102. For example, the intermediary system 104 can be a physical server or group of physical servers that may be accessed via the network 110. In some embodiments, the intermediary system 104 may be a proxy server, a system operated by an Internet service provider (ISP), and/or or some other device or group of devices that retrieve content on behalf of user devices 102.

The intermediary system 104 may include various modules, components, data stores, and the like to provide the content retrieval and processing functionality described herein. For example, the intermediary system 104 may include a content analyzer 140 and a cache 142. The content analyzer 140 may include various modules to provide the functionality described above and in greater detail below. For example, the content analyzer 140 may include a content retriever module 150, a signature generator 152, a content processing module 154, and a content provider module 156. In some embodiments, the content analyzer 140 may include additional or fewer modules than those shown in FIG. 1.

In an embodiment, the content retriever module 150 retrieves a content resource from the origin content server 106 and/or the CDN server 108 on behalf of a user device 102. For example, the content retriever module 150 may receive an indication that the user device 102 is attempting to access a content page. Based on receiving this indication, the content retriever module 150 may request one or more content resources from the origin content server 106 and/or the CDN server 108. The content retriever module 150 may retrieve an entire content resource. For example, the content retriever module 150 may retrieve an entire content resource if the content resource has a small file size or has a particular file type (e.g., an image). Alternatively, the content retriever module 150 may retrieve just a portion of the content resource (e.g., the header) by requesting just the specific portion or by stopping retrieval of the content resource once the portion is fully assembled. For example, the content retriever module 150 may retrieve just a portion of the content resource if the content resource has a large file size and/or includes an index (e.g., a video file).

Once a content resource or a portion of a content resource is retrieved, the signature generator 152 generates a signature of the original, uncompressed content resource (e.g., either of the entire content resource or a portion of the content resource). For example, the signature generator 152 may generate the signature partly or wholly by applying a hash function to at least a portion of the content of the content resource (e.g., a portion of or all of the contents of an image, the entire contents of an index of a video file, etc.). As another example, the signature generator 152 may generate the signature partly or wholly by applying a hash function in combination with another function, such as an encryption algorithm, to at least a portion of the content of the content resource.

The signature generator 152 may determine whether to generate a signature based on a portion of the content resource or the entire content resource according to various factors. Such factors may include a file type (e.g., the signature generator 152 may generate a signature based on an entire image, but may generate a signature only based on a portion of a video file), a file size (e.g., the signature generator 152 may generate a signature based on an entire content resource if its file size is below a threshold value and may generate a signature based on a portion of the content resource if its file size is above the threshold value), whether the content resource includes an index (e.g., the signature generator 152 may generate a signature based on an entire content resource if the content resource does not include an index and may generate a signature based only on a portion of the content resource if the content resource does include an index), a time it may take to retrieve a content resource (e.g., the signature generator 152 may generate a signature based on an entire content resource if the content resource can be retrieved in a time under a threshold value and may generate a signature based on a portion of the content resource if the content resource cannot be retrieved in a time under the threshold value), and/or the like.

In an embodiment, the content processing module 154 compares the generated signature with signatures stored in the cache 142. If the generated signature matches a stored signature, the content processing module 154 may retrieve a compressed content resource associated with the matching signature and instruct the content provider module 156 to transmit the retrieved compressed content resource to the user device 102 (e.g., the browser application running on the user device 102). If the generated signature does not match a stored signature, the content processing module 154 may process the content resource (e.g., compress the content resource) and store the processed content resource along with the generated signature in the cache 142. The content processing module 154 may then instruct the content provider module 156 to transmit the processed content resource to the user device 102 (e.g., the browser application running on the user device 102).

As described above, if the content resource is a video file and/or any large file, the content retriever module 150 may only retrieve a portion of the content resource, such as the header, and a signature may be generated based on the retrieved portion. If the content resource is a video file and/or any large file and the content processing module 154 determines that the generated signature does not match a stored signature, then the content retriever module 150 may be instructed to retrieve the entire content resource. The content processing module 154 may then process the retrieved entire content resource, store the processed content resource along with the generated signature in the cache 142, and transmit the processed content resource to the user device 102. Thus, the entire content resource may not be retrieved unless the same content resource has not been retrieved at a previous time. Select retrieval of a content resource, especially of a content resource that has a large file size, may reduce a delay perceived by the user in the reception of requested content. However, if a content resource that is a video file and/or any large file does not have a header and/or index, the content resource may be processed by initially retrieving the entire content resource and generating a signature based on the entire content resource.

In some embodiments, the signature generator 152 and the content processing module 154 can operate in parallel. For example, the signature generator 152 can begin generating a signature of the original, uncompressed content resource and the content processing module 154 can begin compressing the content resource at the same time or at nearly the same time. The signature generation and compression processes can begin when the content resource is fully received or as the content resource is being received (e.g., but not yet fully received). Once the signature generator 152 finishes generating the signature, the content processing module 154 can perform the comparison discussed above. If the comparison yields a match, then the content processing module 154 may cease compressing the content resource any further. Otherwise, the content processing module 154 may continue to compress the content resource. This parallel processing may further reduce the user-perceived delay in loading a page when no match is found.

In some embodiments, the content processing module 154 generates and caches multiple compressed versions of a content resource (e.g., such that different versions have different compression levels) and selects between these different compressed versions when providing requested content resources to the user device 102. For example, the content processing module 154 may compress a single content resource a plurality of times to produce multiple compressed versions of the content resource. The compressed versions of the content resource may each be files of different sizes. The content processing module 154 may instruct the content provider module 156 to transmit a particular version of the compressed content resource to the user device 102 based on the capabilities of the user device 102, network conditions (e.g., available bandwidth, the connection speed of the user device 102, etc.), and/or a request for a particular version received from the user device 102.

As another example, when the content retriever module 150 retrieves a content resource requested by the user device 102, the signature generator 152 may generate a signature of the content resource and the content processing module 154 may compare it with other stored signatures. If the signature matches a stored signature, the content processing module 154 may determine whether the content resource associated with the stored signature has been compressed at a desired level (e.g., where the desired level is determined based on the capabilities of the user device 102, network conditions, a compression level specified in the request from the user device 102, etc.). If the cache 142 contains a version of the content resource that is compressed at the desired level (e.g., this may be determined based on data, such as metadata, associated with the cached content resource or its signature), the content processing module 154 retrieves the compressed content resource from the cache 142 and instructs the content provider module 156 to transmit the compressed content resource to the user device 102. If the cache 142 does not contain a version of the content resource that is compressed at the desired level, then the content processing module 154 may compress the content resource at the desired level and instruct the content provider module 156 to transmit the compressed content resource to the user device 102. In addition, the content processing module 154 may be aware of the various levels of compression that may be requested or provided to user devices 102 associated with the intermediary system 104. Before, during, or after instructing the content provider module 156 to transmit the compressed content resource to the user device 102, the content processing module 154 may determine whether the content resource has been compressed at all levels. If the content resource has not been compressed at all levels, the content processing module 154 may compress the content resource at the levels for which the content resource has not been compressed and store the compressed content resources in the cache 142 for later use.

The cache 142 may store compressed content resources and signatures associated with the compressed content resources. Data may be stored in the cache 142 after a signature is generated and the content processing module 154 determines that the generated signature does not match any signatures already stored in the cache 142. In an embodiment, the cache 142 stores compressed content resources indefinitely or for a defined period of time. For example, a compressed content resource may continue to be stored in the cache 142 even if the origin content server 106 and/or the CDN server 108 updates the content resource and the updated content resource has also been compressed. As another example, compressed content resources may be deleted from the cache 142 after they have been stored for a set period of time. As another example, compressed content resources defined as the least recently used (e.g., compressed content resources that have not been requested for a set period of time) may be deleted from the cache 142.

The intermediary system 104 may be a single computing device, or it may include multiple distinct computing devices, such as computer servers, logically or physically grouped together to collectively operate as a renderer system. The components of the intermediary system 104 can each be implemented as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated with one or more CDN service providers (e.g., entities that manage multiple CDN servers 108), application service providers, etc.

Example Process for Avoiding Unnecessary Data Compression

Figure 2:
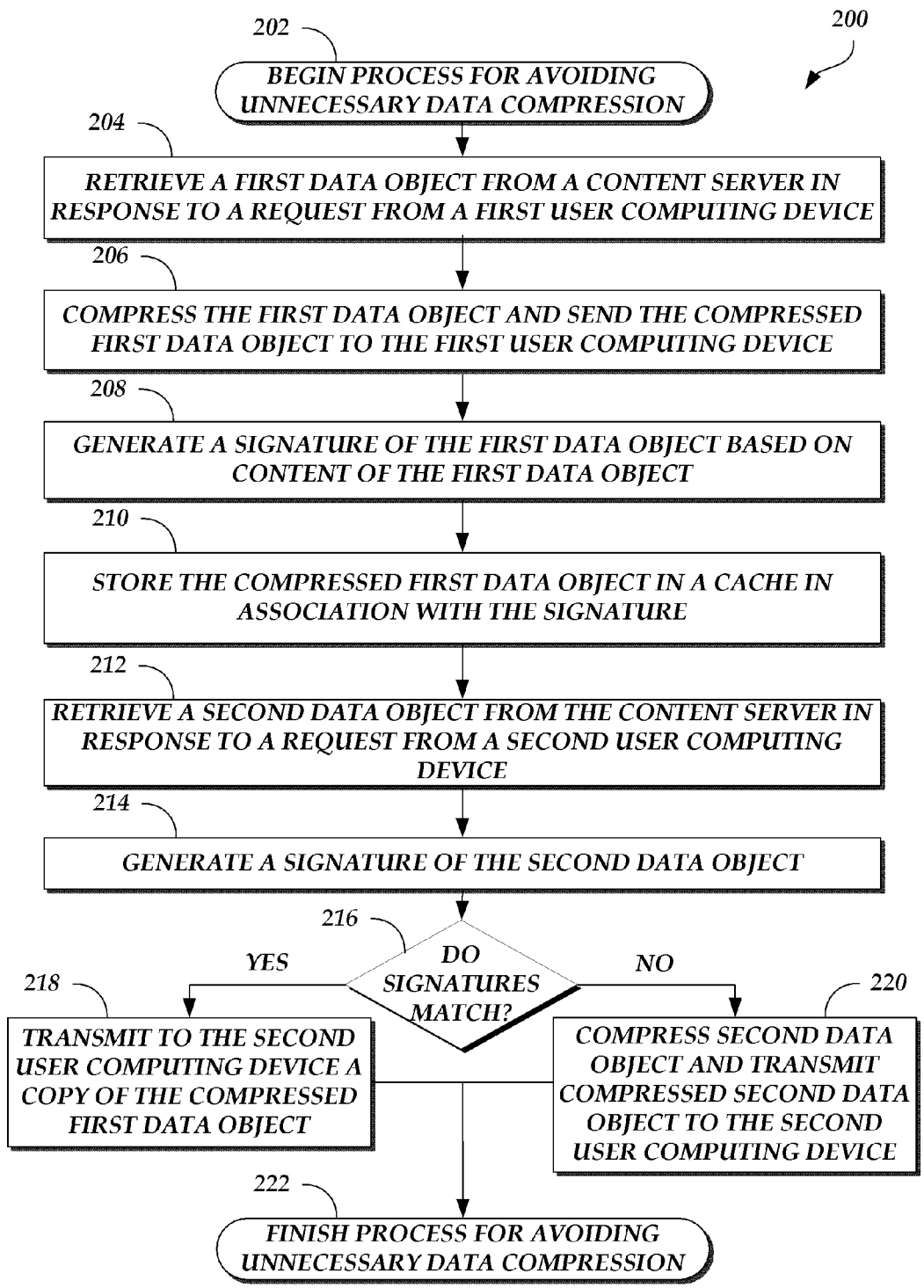
FIG. 2 illustrates a process that may be used by an intermediary system to avoid unnecessary data compression when providing content resources to a user device.

FIG. 2 illustrates a process 200 that may be used by an intermediary system to avoid unnecessary data compression when providing content resources to a user device. As an example, the intermediary system 104 (e.g., the content analyzer 140) of FIG. 1 can be configured to execute the process 200. The process 200 begins at block 202.

At block 204, a first data object is retrieved from a content server in response to a request from a first user computing device. In an embodiment, the first data object is a content resource, such as an image file, an audio file, a video file, or a document. In a further embodiment, the first data object is retrieved in response to a request from the first user computing device to receive the first data object for the purpose of displaying a content page.

At block 206, the first data object is compressed and sent to the first user computing device. In an embodiment, the first data object is compressed to reduce a size of the first data object. The compressed first data object may be sent to a browser application running on the first user computing device. The browser application may be configured to decompress the compressed first data object before displaying the content associated with the first data object.

At block 208, a signature of the first data object is generated based on content of the first data object. In an embodiment, the signature of the first data object is generated by applying a hash function to at least a portion of the content of the first data object. The hash function may be any function that maps data of an arbitrary length to data of a fixed length. The signature may be a value returned by the hash function, which may be referred to herein as a hash or a hash value. For example, a hash function may be applied to the entire contents of the first data object. As another example, a hash function may be applied to an index portion of the first data object and/or a least a portion of, but not all of, a non-index portion of the first data object. In another embodiment, the signature of the first data object is generated by applying a hash function in combination with another function, such as an encryption algorithm, to at least a portion of the content of the first data object.

At block 210, the compressed first data object is stored in a cache in association with the signature. In an embodiment, the first data object is compressed once. In an alternate embodiment, the first data object is compressed a plurality of times at varying degrees of compression to produce different file sizes.

At block 212, a second data object is retrieved from the content server in response to a request from a second user computing device. In an embodiment, the second data object is retrieved in response to a request from the second user computing device to receive the second data object for the purpose of displaying a content page.

At block 214, a signature of the second data object is generated. In an embodiment, the signature of the second data object is generated by applying a hash function to at least a portion of the content of the second data object. The hash function applied to the second data object may be the same hash function applied to the first data object. Furthermore, the hash function may be applied to the same portion of the second data object as was applied to the first data object.

At block 216, a determination is made as to whether the signature of the second data object matches the signature of the first data object. If the signatures match, the process 200 proceeds to block 218. If the signatures do not match, the process 200 proceeds to block 220.

At block 218, a copy of the compressed first data object is transmitted to the second user computing device. In an embodiment, the copy of the compressed first data object is transmitted to the second user computing device in response to the request for the second data object.

At block 220, the second data object is compressed and the compressed second data object is transmitted to the second user computing device. After the copy of the compressed first data object or the compressed second data object is transmitted, the process 200 may be complete, as shown in block 222.

Second Example Process for Avoiding Unnecessary Data Compression

Figure 3:
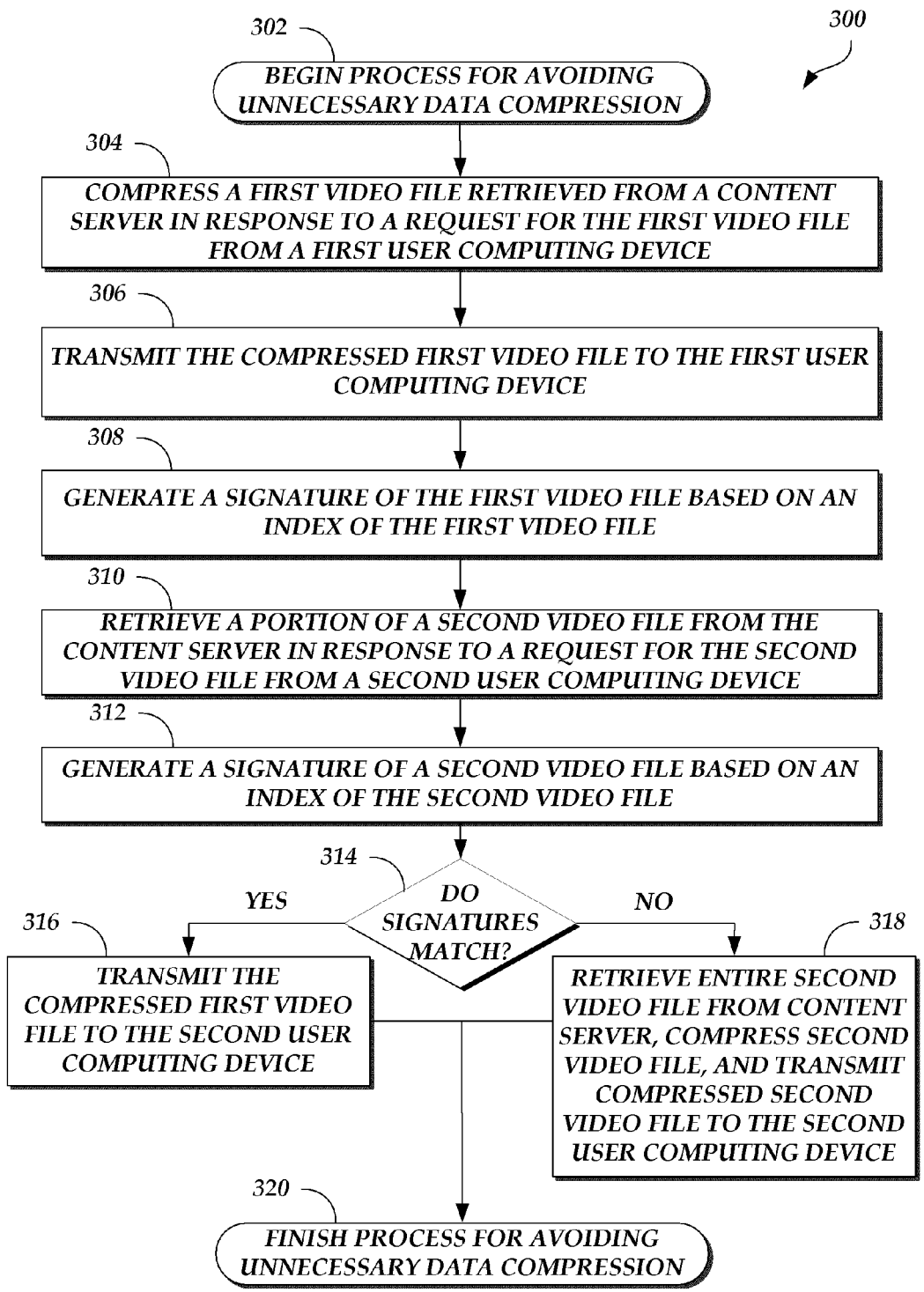
FIG. 3 illustrates a process that may be used by an intermediary system to avoid unnecessary data compression when the data object is a file that includes an index, such as a video file.

FIG. 3 illustrates a process 300 that may be used by an intermediary system to avoid unnecessary data compression when the data object is a file that includes an index, such as a video file. As an example, the intermediary system 104

(e.g., the content analyzer 140) of FIG. 1 can be configured to execute the process 300. The process 300 begins at block 302.

At block 304, a first video file retrieved from a content server in response to a request for the first video file from a first user computing device is compressed. In an embodiment, the first video file includes a header portion and a data portion. The header portion may include an index that points to the location of data samples in the data portion of the first video file.

At block 306, the compressed first video file is transmitted to the first user computing device. In an embodiment, the compressed first video file is transmitted to a browser application running on the first user computing device. The browser application may be configured to decompress the compressed first video file before displaying or playing the content associated with the first video file.

At block 308, a signature of the first video file is generated based on an index of the first video file. In an embodiment, the signature of the first video file is generated by applying a hash function to the index in the header of the video file. Generally, a change to a video file results in a change to the index. Thus, applying a hash function to the index of the video file and comparing the resulting hash value with other hash values may be adequate to determine whether video files are the same or different. In a further embodiment, the signature of the first video file is generated by applying a hash function to the index and at least a portion of the data portion of the video file (e.g., the data samples). For example, a hash function may be applied to the entire index of the first video file and a least a portion of, but not all of, a non-index portion of the first video file. As described above, generating the signature based on the entire contents of a large file, such as a video file, may be time consuming. Thus, generating the signature based on the index of the video file, rather than on the entire contents of the video file, may reduce the processing time associated with generating the signature and thereby reduce the user-perceived delay in loading a page.

At block 310, a portion of a second video file is retrieved from the content server in response to a request for the second video file from a second user computing device. In an embodiment, just the header portion of the second video file is requested from the content server. Alternatively, retrieval of the second video file from the content server may be terminated once the header portion of the second video file can be fully assembled. The header portion of the second video file may include an index of the second video file.

At block 312, a signature of a second video file is generated based on the index of the second video file. In an embodiment, the signature of the second video file is generated in the same manner as the signature of the first video file.

At block 314, a determination is made as to whether the signature of the second video file matches the signature of the first video file. If the signatures match, the process 300 proceeds to block 316. If the signatures do not match, the process 300 proceeds to block 318.

At block 316, the compressed first video file is transmitted to the second user computing device. At block 318, the entire second video file is retrieved from the content server, compressed, and transmitted to the second user computing device. After the compressed first video file or the compressed second video file is transmitted, the process 300 may be complete, as shown in block 320.

Example Signature Generation and Comparison

Figure 4:
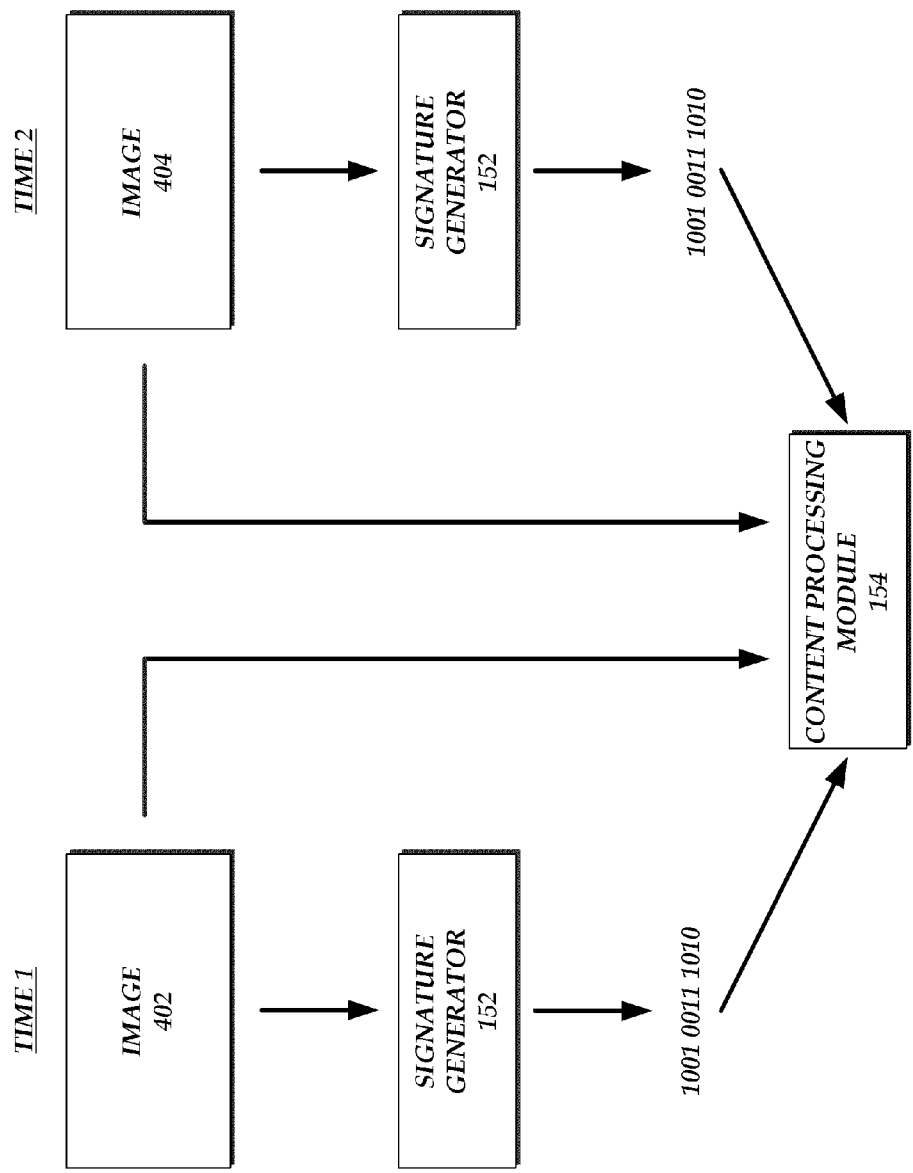
FIG. 4 illustrates an example of a comparison of signatures generated by an intermediary system, such as the intermediary system of FIG. 1.

FIG. 4 illustrates an example of a comparison of signatures generated by an intermediary system, such as the intermediary system 104 of FIG. 1. As illustrated in FIG. 4, the intermediary system 104 (e.g., the content analyzer 140) may receive an image 402 at time 1. The image 402 may be received from the origin content server 106 and/or the CDN server 108 based on a request from the user device 102 for the image 402. The content analyzer 140 may generate a signature of the image 402 by passing the image 402 through the signature generator 152.

As described herein, the signature generator 152 may generate a signature of the image 402 by applying a hash function to the content of the original, uncompressed image 402. For example, the signature generator 152 can apply a hash function to a portion of, or all of, the contents of the image 402. As illustrated in FIG. 4, the signature generator 152 may generate a signature for the image 402 that is represented by the hash value "1001 0011 1010." The content analyzer 140 may further compress the image 402 and store the compressed image 402 along with the generated signature in a cache, such as the cache 142.

At time 2, which is some time after time 1, the content analyzer 140 may receive an image 404. The image 404 may be received from the origin content server 106 and/or the CDN server 108 based on a request from the same user device 102 that requested the image 402 or a different user device 102. The content analyzer 140 may generate a signature of the image 404 by passing the image 404 through the signature generator 152. The signature generator 152 may generate a signature for the image 404 in the same manner as for the signature generated for the image 402. In some embodiments, the signature generator 152 begins generating the signature for the image 404 and the content processing module 154 begins compressing the image 404 at the same time or at nearly the same time. As illustrated in FIG. 4, the signature generator 152 may generate a signature for the image 404 that is represented by the hash value "1001 0011 1010."

Before compressing the image 404 or while the image 404 is being compressed, the content analyzer 140 (e.g., the content processing module 154) may compare the signature for the image 404 with other signatures stored in the cache 142. As depicted, the signature for the image 402 and the signature for the image 404 are the same. Because each signature is unique, the image 402 and the image 404 may be assumed to be the same image. Accordingly, the content analyzer 140 may not compress the image 404 or may cease compressing the image 404 if compression has already begun. Rather, the content analyzer 140 may retrieve the compressed image 402 from the cache 142 and transmit the compressed image 402 to the user device 102 that requested the image 404.

Figure 5:
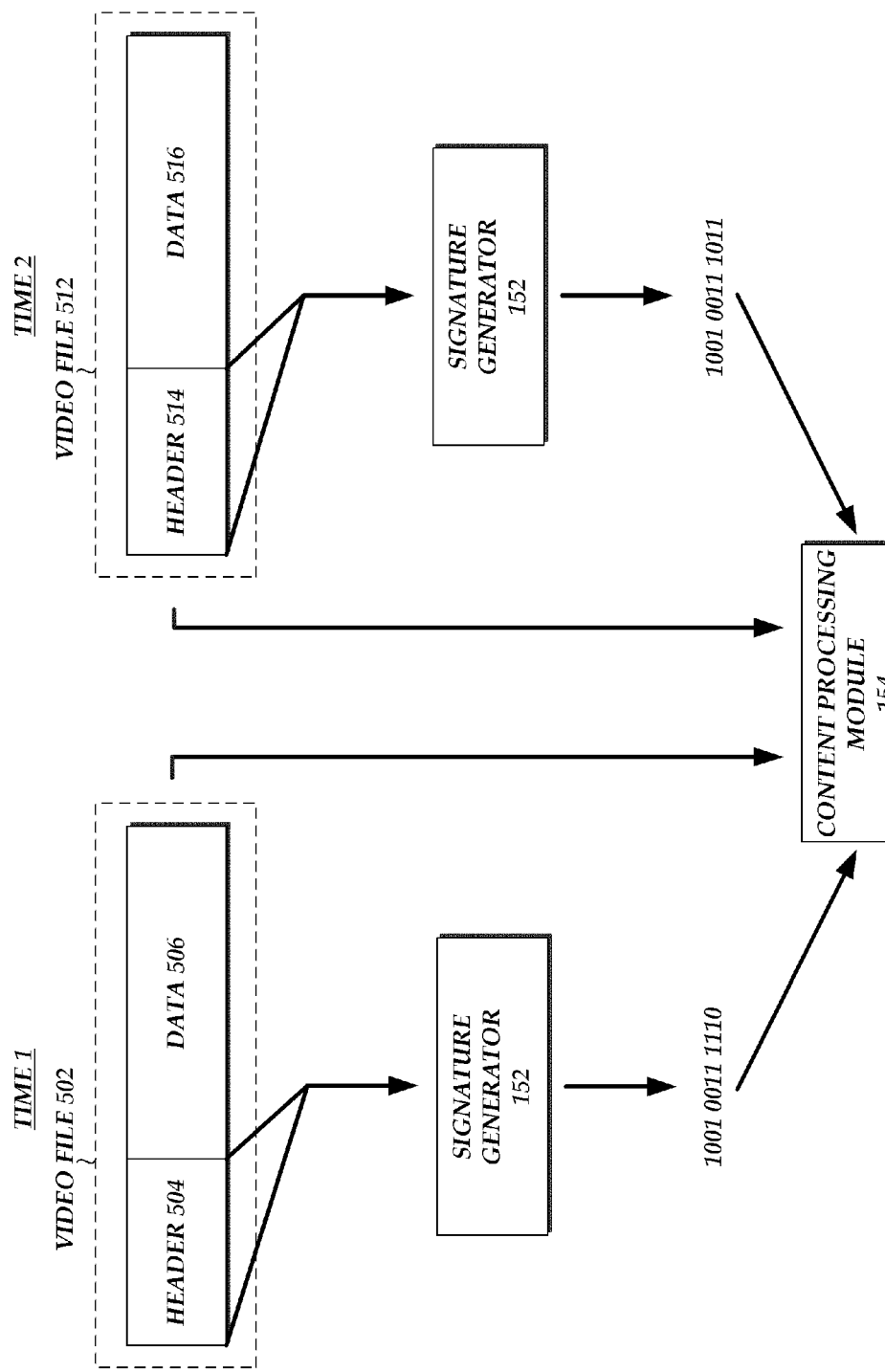
FIG. 5 illustrates another example of a comparison of signatures generated by an intermediary system, such as the intermediary system of FIG. 1.

FIG. 5 illustrates another example of a comparison of signatures generated by an intermediary system, such as the intermediary system 104 of FIG. 1. As illustrated in FIG. 5, the intermediary system 104 (e.g., the content analyzer 140) may receive a portion of a video file 502 at time 1. The video file 502 may include a header portion 504 and a data portion 506, and the intermediary system 104 may receive the header portion 504 and optionally a portion of the data portion 506. The portion of the video file 502 may be received from the origin content server 106 and/or the CDN server 108 based on a request from the user device 102 for the video file 502. The content analyzer 140 may generate a signature of the video file 502 by passing the portion of the video file 502 through the signature generator 152.

As described herein, the signature generator 152 may generate a signature of the video file 502 by applying a hash function to the content of the original, uncompressed video file 502. For example, the signature generator 152 can apply a hash function to a portion of the header portion 504. In particular, the signature generator 152 can apply a hash function to an index found within the header portion 504. As illustrated in FIG. 5, the signature generator 152 may generate a signature for the video file 502 that is represented by the hash value "1001 0011 1110." If the hash value is not already stored in a cache, such as the cache 142, the content analyzer 140 may further retrieve the entire video file 502, compress the video file 502, and store the compressed video file 502 along with the generated signature in the cache.

At time 2, which is some time after time 1, the content analyzer 140 may receive a portion of a video file 512. The video file 512 may include a header portion 514 and a data portion 516, and the intermediary system 104 may receive the header portion 514 and optionally a portion of the data portion 516. The portion of the video file 512 may be received from the origin content server 106 and/or the CDN server 108 based on a request from the same user device 102 that requested the video file 502 or a different user device 102. The content analyzer 140 may generate a signature of the video file 512 by passing the portion of the video file 512 through the signature generator 152. The signature generator 152 may generate a signature for the video file 512 in the same manner as for the signature generated for the video file 502. In some embodiments, the signature generator 152 begins generating the signature for the video file 512 and the content processing module 154 begins compressing the portion of the video file 512 at the same time or at nearly the same time. As illustrated in FIG. 5, the signature generator 152 may generate a signature for the video file 512 that is represented by the hash value "1001 0011 1011."

Before compressing the portion of the video file 512 or while the portion of the video file 512 is being compressed, the content analyzer 140 (e.g., the content processing module 154) may compare the signature for the video file 512 with other signatures stored in the cache 142. As depicted, the signature for the video file 502 and the signature for the video file 512 are different. Because each signature is unique, the video file 502 and the video file 512 may be assumed to be different video files. Accordingly, the content analyzer 140 may retrieve the entire video file 512 from the origin content server 106 and/or the CDN server 108, compress or continue to compress the video file 512, and transmit the compressed video file 512 to the user device 102 that requested the video file 512.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the compression or signature algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of avoiding unnecessary data compression, the method comprising:
    as implemented by a computer system comprising one or more computing devices, the computer system serving as an intermediary system between user computing devices and content servers, the computer system configured with specific executable instructions,
    retrieving a first data object from a content server in response to a request from a first user computing device;
    compressing the first data object and sending the compressed first data object to the first user computing device;
    generating a signature of the first data object based on all of the content of the first data object if the first data object does not comprise an index, and such that the signature of the first data object is generated based on less than all of the content of the first data object if the first data object comprises an index;
    storing the compressed first data object in a cache in association with the signature;
    retrieving a second data object from the content server in response to a request from a second user computing device;
    generating a signature of the second data object; and
    in connection with a determination that the signature of the second data object matches the signature of the first data object, transmitting to the second user computing device, in response to the request from the second user computing device, a copy of the compressed first data object stored in the cache.

2. The computer-implemented method of claim 1, further comprising:
    in connection with a determination that the signature of the second data object does not match the signature of the first data object, compressing the second data object; and
    transmitting the compressed second data object to the second user computing device.

3. The computer-implemented method of claim 1, further comprising storing the compressed second data object in the cache in association with the signature of the second data object.

4. The computer-implemented method of claim 1, wherein generating a signature of the first data object comprises applying a hash function to a portion of the content of the first data object.

5. The computer-implemented method of claim 1, wherein the index is included within a header of the first data object, wherein the first data object is a video file that includes the index and video content, and wherein generating a signature of the first data object comprises applying a hash function to less than all of the content of the video file.

6. The computer-implemented method of claim 1, wherein the first data object is a video file that includes the index and video content, and wherein generating a signature of the first data object comprises applying a hash function to the index of the video file and at least a portion of, but not all of, the video content.

7. The computer-implemented method of claim 1, wherein the first data object comprises an index portion that comprises the index and a non-index portion, and wherein generating a signature of the first data object comprises applying a hash function to the index portion and at least a portion of, but not all of, the non-index portion.

8. The computer-implemented method of claim 1, wherein compressing the first data object comprises compressing the first data object at a first level of compression.

9. The computer-implemented method of claim 8, further comprising:
compressing the first data object at a second level of compression in connection with a determination that the second user computing device requested the second data object compressed at the second level of compression; and
transmitting the first data object compressed at the second level of compression to the second user computing device.

10. A system comprising:
a computer data repository that stores processed data objects and signatures associated with the processed data objects, the computer data repository comprising a storage device; and
a computing system comprising one or more computing devices, the computing system in communication with the computer data repository and programmed to implement:
a content retriever module configured to retrieve a first data object from a content server in response to a request from a first user computing device;
a content processing module configured to process the first data object;
a content provider module configured to send the processed first data object to the first user computing device; and
a signature generator configured to generate a first signature of the first data object, wherein the signature generator is configured to generate the first signature based on less than all of the content of the first data object in response to a determination that the first data object comprises an index, wherein the signature generator is configured to generate the first signature based on all of the content of the first data object in response to a determination that the first data object does not comprise the index, wherein the signature generator is further configured to store the processed first data object in the computer data repository in association with the first signature,
wherein the content retriever is further configured to retrieve a second data object from the content server in response to a request from a second user computing device,
wherein the signature generator is further configured to generate a second signature of the second data object, and
wherein the content provider module, in connection with a determination that the second signature of the second data object matches the first signature of the first data object, is further configured to transmit to the second user computing device, in response to the request from the second user computing device, a copy of the processed first data object stored in the computer data repository.

11. The system of claim 10, wherein the content processing module is configured to one of compress the first data object, resize the first data object, apply a watermark to the first data object, add a logo to the first data object, or compile the first data object into a format that is executable in a time that is faster than a time to execute the first data object.

12. The system of claim 10, wherein the content processing module, in connection with a determination that the second signature of the second data object does not match the first signature of the first data object, is further configured to process the second data object.

13. The system of claim 12, wherein the content provider module is further configured to transmit the processed second data object to the second user computing device.

14. The system of claim 12, wherein the content processing module is further configured to store the processed second data object in the computer data repository in association with the second signature of the second data object.

15. The system of claim 10, wherein the signature generator is further configured to apply a hash function to a portion of the content of the first data object.

16. The system of claim 10, wherein the index is included within a header of the first data object, wherein the first data object is a video file that includes the index and video content, and wherein the signature generator is further configured to apply a hash function to less than all of the content of the video file.

17. The system of claim 10, wherein the first data object is a video file that includes the index and video content, and wherein the signature generator is further configured to apply a hash function to the index of the video file and at least a portion of, but not all of, the video content.

18. The system of claim 10, wherein the first data object comprises an index portion that comprises the index and a non-index portion, and wherein the signature generator is further configured to apply a hash function to the index portion and at least a portion of, but not all of, the non-index portion.

19. The system of claim 10, wherein the content processing module is configured to compress the first data object, wherein the first data object is compressed at a first level of compression, and wherein the content processing module is further configured to, in connection with a determination that the second user computing device requested the second data object compressed at a second level of compression, compress the first data object at the second level of compression.

20. The system of claim 19, wherein the content provider module is further configured to transmit the first data object compressed at the second level of compression to the second user computing device.

21. A non-transitory computer storage system comprising a non-transitory storage device, said computer storage system having stored thereon executable program instructions that direct a computer system to at least:
retrieve a first data object from a content server in response to a request from a first user computing device;
process the first data object;
transmit the processed first data object to the first user computing device;
generate a signature of the first data object based on all of the content of the first data object if the first data object does not comprise an index, and such that the signature is generated based on less than all of the content of the first data object if the first data object comprises an index;
retrieve a second data object from the content server in response to a request from a second user computing device;
generate a signature of the second data object; and
transmit, in connection with a determination that the signature of the second data object matches the signature of the first data object, a copy of the processed first data object to the second user computing device in response to the request from the second user computing device.

22. The non-transitory computer storage system of claim 21, wherein the executable program instructions further direct the computing system to at least one of compress the first data object, resize the first data object, apply a watermark to the first data object, add a logo to the first data object, or compile the first data object into a format that is executable in a time that is faster than a time to execute the first data object.

23. The non-transitory computer storage system of claim 21, wherein the executable program instructions further direct the computing system to at least process, in connection with a determination that the signature of the second data object does not match the signature of the first data object, the second data object.

24. The non-transitory computer storage system of claim 23, wherein the executable program instructions further direct the computing system to at least transmit the processed second data object to the second user computing device.

25. The non-transitory computer storage system of claim 21, wherein the executable program instructions further direct the computing system to at least apply a hash function to a portion of the content of the first data object.

26. A non-transitory computer-readable medium comprising a non-transitory storage device, said computer storage system having stored thereon executable program instructions that direct a computer system to at least:
process a first video file retrieved from a content server in response to a request for the first video file from a first user computing device, wherein the first video file comprises a header and a data portion, and wherein the header comprises a first index;
transmit the processed first video file to the first user computing device;
generate a signature of the first video file based on less than all of the data portion of the first video file in response to a determination that the first video file comprises the first index;
retrieve a portion of, but not all of, a second video file from the content server in response to a request for the second video file from a second user computing device, wherein the portion of the second video file comprises a second index;
generate a signature of the second video file based on the second index; and
transmit the processed first video file to the second user computing device in connection with a determination that the signature of the second video file matches the signature of the first video file.

27. The non-transitory computer storage system of claim 26, wherein the executable program instructions further direct the computing system to at least one of compress the first video file, resize the first video file, apply a watermark to the first video file, add a logo to the first video file, or compile the first video file into a format that is executable in a time that is faster than a time to execute the first video file.

28. The non-transitory computer storage system of claim 26, wherein the executable program instructions further direct the computing system to at least:
retrieve, in connection with a determination that the signature of the second video file does not match the signature of the first video file, all of the second video file from the content server; and
process the second video file.

29. The non-transitory computer storage system of claim 28, wherein the executable program instructions further direct the computing system to at least transmit the processed second video file to the second user computing device.

30. The non-transitory computer storage system of claim 26, wherein the executable program instructions further direct the computing system to at least apply a hash function to less than all of the data portion of the first video file.

31. The computer-implemented method of claim 1, wherein the index comprises pointers to data samples within the content of the first data object.

* * * * *